Aug. 9, 1927.
C. CLAUS
1,638,797
SELF ALIGNING BEARING AND METHOD OF MAKING THE SAME
Filed Oct. 1, 1926
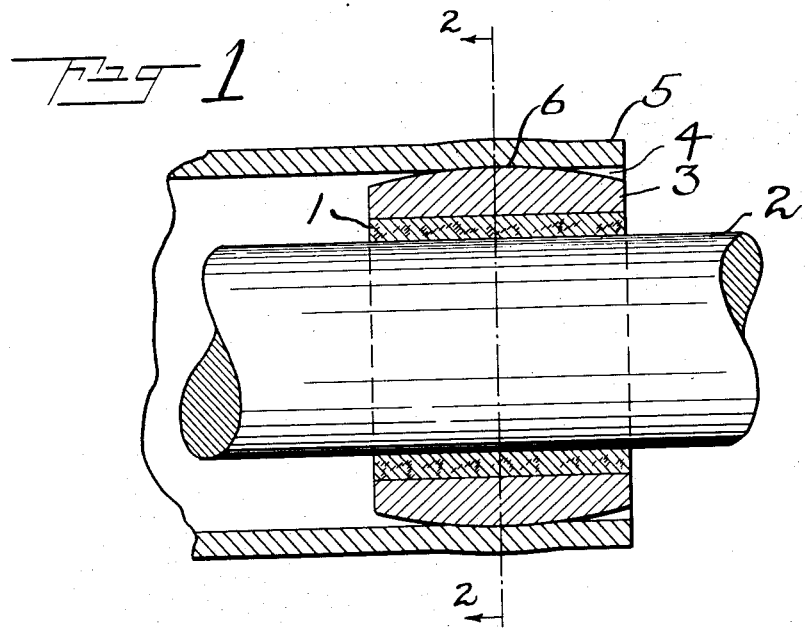
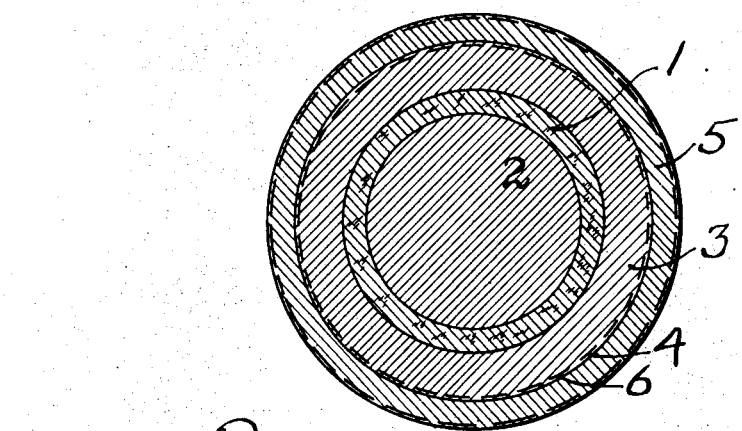
INVENTOR.
Carl Claus
BY
ATTORNEYS Patented Aug. 9, 1927.

1,638,797

UNITED STATES PATENT OFFICE.

CARL CLAUS, OF PLAINFIELD, NEW JERSEY, ASSIGNOR TO BOUND BROOK OIL-LESS BEARING COMPANY, OF BOUND BROOK, NEW JERSEY, A CORPORATION OF NEW JERSEY.

SELF-ALIGNING BEARING AND METHOD OF MAKING THE SAME.

Application filed October 1, 1926. Serial No. 138,894.

My invention relates in general to bearings and their manufacture and has reference more particularly to self-aligning bearing constructions and methods of making the same.

In my copending applications for U. S. Patents for self-aligning bearing constructions, filed May 19, 1926, Serial Nos. 110, 117, 110, 118, and 110, 119, I disclose ball-shaped composition bearing bushings, of the self-lubricating type, and having a spherical outer contour or periphery, also the method of making the same. This composition bushing may be made of compressed metal powders and the article heat-treated, hardened and impregnated with lubricating oil which is taken into the pores, and then reduced to final size by a peculiar sizing operation, both the formation and sizing of which bushing may be carried out in accordance with the descriptions in my pending applications for patents, filed October 26, 1923, Serial Nos. 671,032 and 671,033, and the material used may be the product disclosed in my pending application for patent, filed May 26, 1923, Serial No. 112,404, as I find that the same is especially well adapted for use as a bushing inserted in the ball-shaped steel adapter herein set forth. The self-aligning bushings of composition material above referred to in my said applications, are preferably seated in a correspondingly ball-shaped socket in order to provide self-alignment movement of the bushing, and the outer socket or casing is made of steel or other hard metal which has sufficient strength to withstand pressing into a cylindrical bore or housing without changing the ball-shaped seat or socket.

Another means for obtaining a self-aligning bearing of the self-lubricating porous type is set forth in another application for patent, filed by me on even date herewith, wherein a soft-rubber shell or supporting member is molded directly on the exterior of the bushing of porous metal composition, and the yielding properties of the rubber, especially when favored with a suitable shape of the outer casing or shell permit a certain self-alignment. Rubber or other material of similar elastic properties has also been adopted in order to permit variations in the size of the housing into which the bushings are to be pressed.

In making bushings which are to be pressed into steel tubing such as is used for steering masts or columns of automobiles, for instance, I have found that I can obtain a self-aligning construction by forming the bushing with a convexed periphery of spherical or approximately spherical form, and then pressing the bushing into a cylindrical tube having a smaller bore size than the diameter of said spherical form of periphery. In doing so I have found that the tubing expands sufficiently to provide in the tube wall a socket or seat which retains the bushing in place therein and at the same time permits it to align itself. Such variations as found in the bore sizes of commercial seamless tubing are not objectionable when pressing these bushings into place and it is, therefore, not necessary to ream these tubings. While bushings consisting of steel, bronze and other metals can be used for this purpose, I prefer to use these metals for the outer shell or bushing-support only and to make the inner lining or bushing of the bearing of a good bearing material such as high lead and bronze. The best results I have obtained have been with the use of the self-lubricating porous metal composition type of material such as that described in my pending applications hereinabove referred to. This is used as a cylindrical lining for an outer member or shell which is of a more compression-resisting material, such as steel tubing, for instance.

In order to make the entire invention clearer, I have illustrated herewith an embodiment of the same in a steering mast structure for automobiles. In the said illustrations—

Fig. 1 shows a view of a longitudinal section of a device embodying my improvements with the contained shaft shown in elevation; and Fig. 2 is a cross-section of the device shown in Fig. 1, the plane of the section being indicated by the dotted line 2—2 in Fig. 1.

Referring to the drawings, 1 indicates a cylindrical bushing in the bore of which is journaled the shaft 2. The bushing is preferably of the composite self-lubricating porous metal type such as described in my said pending applications and which will take up a comparatively large amount of lubricating oil or grease for the automatic lubrication of the bushing. The bushing after being finished to size in respect to all of its dimensions is inserted snugly within the bore of a shell or supporting member 3 of a harder metal such as steel or bronze. The exterior of the member 3, is made convex around its periphery and in spherical form or substantially so, as indicated at 4, and with the bushing fitting tightly within the bore of the supporting member, the two parts act as a unit. I then take the tube 5, which is of harder metal than the material of the bushing and has a bore which is under size when compared with the diameter of the spherical periphery of the supporting-member, and insert the unitary device, comprising the supporting-member and its lining or bushing, into the interior of the tube with sufficient force to expand the tube laterally and form in its walls a circular seat 6, extending around the interior of the tube and having a counterpart formation to the spherical surface of the member 2, as indicated in the drawings. By adopting this simple method of constructing the device, the necessary seat for the supporting-member to rock in for the purpose of self-alignment, is in fact automatically formed by the operation of forcing the supporting-member into its desired place of location in the tube. I find that under this condition of the expanded interior of the tube by the entering process of the supporting-member, the latter remains in place and functions fully as a self-aligning element.

It will be noted that the supporting-member or shell 3, resists compression under force more than the encasing tube 5, so that when the member is forced therein, the material of the tube is expanded by the stronger element and thus there is easily formed therein a seat of sufficient area to accommodate the spherical periphery of the supporting-member. While the construction of the tube at the seat therein is sufficient to hold the supporting-member in operative position therein, it is not of sufficient tension to check the desired rocking movement of the supporting-member or in any way interfere with its functions.

Having thus described my invention, what I claim and desire to secure by Letters Patent, is:

1. In a self-aligning bearing construction, a bearing device in which the shaft may be journaled, said device having a spherical periphery, and a tube into which said device is forcibly inserted so as to expand the tube wall and form therein a seat for the spherical periphery of said device.

2. In a self-aligning bearing construction, a bushing of the self-lubricating type in which a shaft may be journaled, a supporting-member or shell in the bore of which the bushing is disposed, said member being of harder material than the bushing and having a rounded periphery, and a tube capable of yielding more than said supporting-member under pressure and having a lesser interior diameter than the exterior diameter of said member, the said member being capable of being forced into said tube to expand it and to form thereby an annular seat in the interior of the tube wall for seating the rounded periphery of said member.

3. In a self-aligning bearing construction, a bushing of composite porous metal type, a supporting-member of harder metal than said bushing, said member having the bushing set therein and the periphery of said member being convexed and substantially spherical, a tube constructed to yield under pressure more than said supporting-member and having a smaller bore than the diameter of the spherical convexity of the supporting-member, said supporting-member being forcibly entered within the bore of the tube and causing it to expand into a seat formation for the spherical part of said supporting-member.

4. The method of making a self-aligning device having a tube with a bearing seated therein so as to be capable of rocking on its seat under a self-aligning action, which consists in providing a bearing having a spherically shaped periphery and then forcing the same into a tube of smaller bore than the diameter of said periphery of the bearing so as to expand the wall of the tube and form upon its interior a seat for said bearing to rock in.

5. The method of making a self-aligning device having a self-lubricating bushing inserted in the bore of a supporting-member made of harder material than the bushing and disposed in a seat within the tube, which consists in providing a bushing of self-lubricating material and inserting the same in the bore of a shell or annular supporting-member of harder material than said bushing and having a rounded periphery of substantially spherical form, then forcing said supporting-member into the tube so as to forcibly expand its wall and thereby form a seat for the periphery of said supporting-member.

6. The method of making a self-aligning device having a tube with a bearing seated therein so as to be capable of rocking on its seat under self-aligning action, which consists in providing a bearing having a spherically shaped periphery and then forcing the same into a tube of less interior diameter than the diameter of the periphery of said member so as to dilate the tube wall and form therein a seat for said bearing to rock in and causing said bearing to be retained in its seat by the tension of said dilated portion of the tube.

Signed at borough of Middlesex, in the county of Middlesex and State of New Jersey, this 30th day of September, A. D. 1926.

CARL CLAUS.